(12) United States Patent
Silverman et al.

(10) Patent No.: US 9,756,392 B2
(45) Date of Patent: Sep. 5, 2017

(54) NON-LINEAR NAVIGATION OF VIDEO CONTENT

(71) Applicant: Disney Enterprises, Inc., Burbank, CA (US)

(72) Inventors: Leon Silverman, Burbank, CA (US); Mark Arana, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 358 days.

(21) Appl. No.: 14/136,897

(22) Filed: Dec. 20, 2013

(65) Prior Publication Data

US 2015/0063781 A1 Mar. 5, 2015

Related U.S. Application Data

(60) Provisional application No. 61/871,817, filed on Aug. 29, 2013.

(51) Int. Cl.
H04N 21/472 (2011.01)
H04N 21/41 (2011.01)
H04N 21/84 (2011.01)
H04N 21/845 (2011.01)
H04N 21/8545 (2011.01)
G11B 27/10 (2006.01)

(52) U.S. Cl.
CPC ..... H04N 21/47205 (2013.01); G11B 27/105 (2013.01); H04N 21/4126 (2013.01); H04N 21/84 (2013.01); H04N 21/8456 (2013.01); H04N 21/8545 (2013.01)

(58) Field of Classification Search
CPC ......... G06F 17/30781; G06F 17/30852; G06F 17/30846; G06F 17/30849; G06F 17/30017; G06F 17/30817; G06F 17/3082; G06F 17/30864; G06F 17/30867; G06F 3/0482; H04N 21/47205
See application file for complete search history.

(56) References Cited

U.S. PATENT DOCUMENTS

| 8,745,500 B1* | 6/2014 | Kostello | G11B 27/34 386/282 |
|---|---|---|---|
| 2007/0099684 A1* | 5/2007 | Butterworth | G11B 27/034 463/1 |
| 2009/0150947 A1* | 6/2009 | Soderstrom | G06F 17/30817 725/93 |
| 2013/0091431 A1* | 4/2013 | Master | H04N 21/44008 715/719 |
| 2014/0289606 A1* | 9/2014 | Koormamtharayil | G06F 17/2241 715/234 |

* cited by examiner

Primary Examiner — Jennifer To
Assistant Examiner — Terri Filosi
(74) Attorney, Agent, or Firm — Sheppard, Mullin, Richter & Hampton LLP

(57) ABSTRACT

Disclosed is a method for non-linear navigation of video content comprising receiving a video content asset comprising a plurality of video content clips tagged with information tags, the information tags connecting the video content clips to form a plurality of navigation paths; presenting a first video clip from the plurality of video clips; displaying a set of navigation options for selection by a user, each of the navigation options corresponding to a particular navigation path; receiving a navigation option selection from the user; and presenting a second video clip from the plurality of video clips based on the navigation path corresponding to the navigation option selected by the user.

30 Claims, 5 Drawing Sheets

NON-LINEAR NAVIGATION OF VIDEO CONTENT

CROSS-REFERENCE TO RELATED APPLICATIONS

This application claims the benefit of U.S. Provisional Application No. 61/871,817, filed on Aug. 29, 2013, which is incorporated herein by reference as if fully set forth herein.

TECHNICAL FIELD

The present disclosure relates generally to digital media, and more particularly to systems and methods for navigating digital video content.

SUMMARY OF THE INVENTION

In a first embodiment, the present disclosure may be embodied in a method for non-linear navigation of video content comprising receiving a video content asset comprising a plurality of video clips; receiving a plurality of information tags relating to the plurality of video clips, the plurality of information tags connecting the plurality of video clips in a plurality of navigation paths, each navigation path defining a particular set of video clips in a particular order; presenting a first video clip from the plurality of video clips; displaying a set of navigation options for selection by a user, each of the navigation options corresponding to a particular navigation path; receiving a navigation option selection; and presenting a second video clip from the plurality of video clips based on the navigation path corresponding to the navigation option selected.

In a first aspect, the plurality of information tags may comprise one or more character information tags, each of the one or more character information tags corresponding to a particular character and connecting a set of the plurality of video clips to form a character path. The set of navigation options may comprise one or more character options based on the character tags such that selection of a character option results in presentation of the video content asset according to a particular character path. Displaying a set of navigation options may comprise displaying one or more character options based on the characters present in the first video clip. Additionally, displaying a set of navigation options may comprise displaying a plurality of video feeds, each video feed corresponding to a particular character. Each video feed may display a time-based feed of a particular character, such that a user can see what each character is doing at a particular time within the timeline of the video content asset.

In a second aspect, the plurality of information tags may comprise one or more location information tags, each of the one or more location information tags corresponding to a particular scene location and connecting a set of the plurality of video clips to form a location path. The set of navigation options may comprise one or more location options based on the location tags such that selection of a location option results in presentation of the video content asset according to a particular location path. Displaying a set of navigation options may comprise displaying one or more location options based on the scene location of the first video clip. Additionally, displaying a set of navigation options may comprise displaying a plurality of video feeds, each video feed corresponding to a particular scene location. Each video feed may display a time-based feed of a particular scene location, such that a user can see what is happening at each scene location at a particular time within the timeline of the video content asset.

In a third aspect, the plurality of information tags may comprise one or more subplot information tags, each of the one or more subplot information tags corresponding to a particular subplot and connecting a set of the plurality of video clips to form a subplot path. The set of navigation options may comprise one or more subplot options based on the subplot tags such that selection of a subplot option results in presentation of the video content asset according to a particular subplot path. Displaying a set of navigation options may comprise displaying one or more subplot options based on the subplots involved in the first video clip. Additionally, displaying a set of navigation options may comprise displaying a plurality of video feeds, each video feed corresponding to a particular subplot. Each video feed may display a time-based feed of a particular subplot, such that a user can see what is happening within each subplot at a particular time within the timeline of the video content asset.

In a fourth aspect of this embodiment, the first video clip may be presented in a first display, and the navigation options may be displayed on a second display.

In a fifth aspect of this embodiment, receiving a plurality of information tags relating to the plurality of video clips may comprise receiving user-generated information tags relating to the video clips. The plurality of user-generated information tags may connect the plurality of video clips in one or more user-generated navigation paths, each user-generated navigation path defining a particular set of video clips in a particular order. The method may further comprise sharing at least one user-generated navigation path with a second user such that the second user is able to navigate the video content asset according to the user-generated navigation path.

The present disclosure may also be embodied in computer readable media comprising an instruction set configured to command a computing device to carry out the methods described above.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

Figure 1:
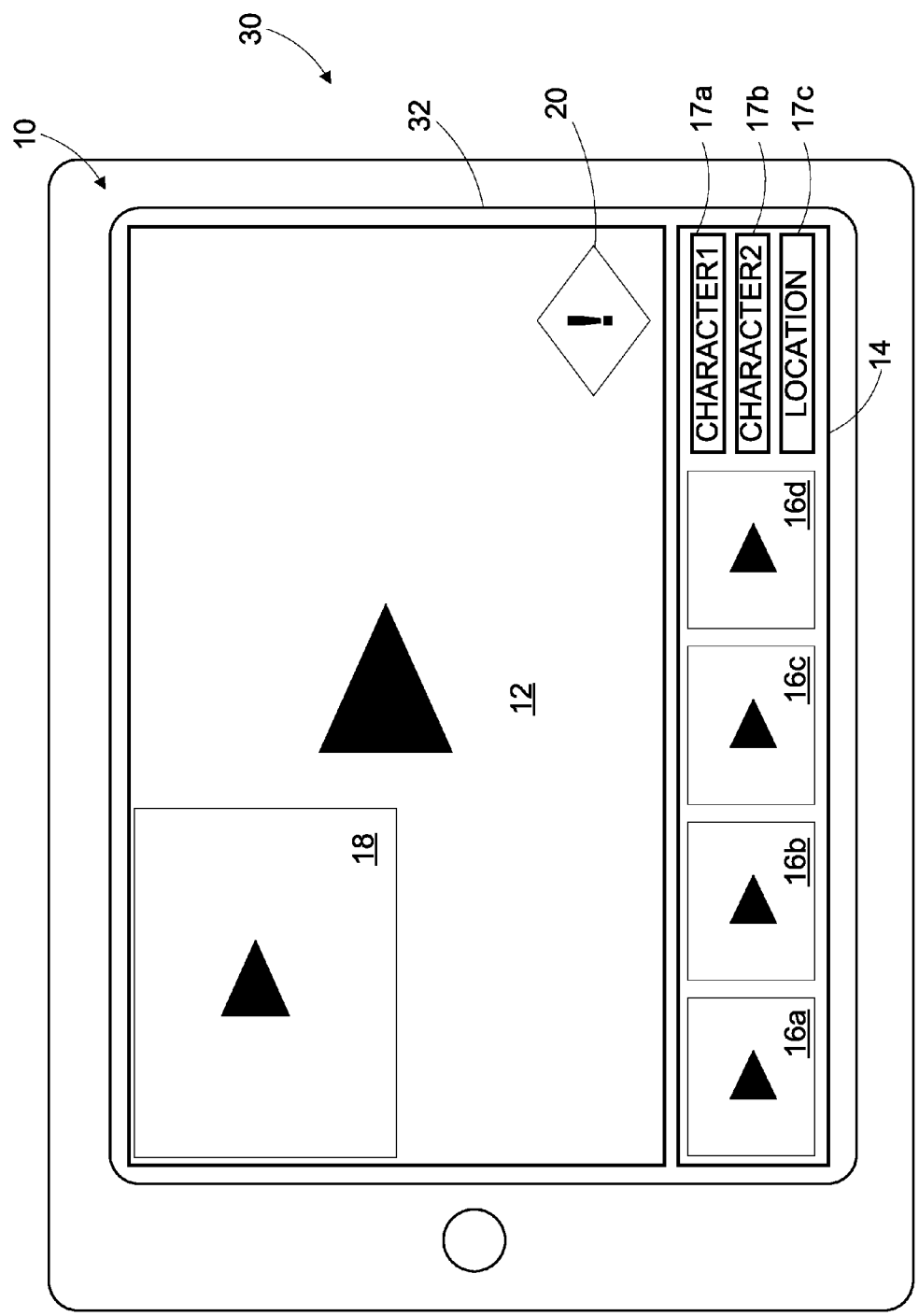
FIG. 1 is an example digital video content navigation interface in accordance with an embodiment of the present disclosure.

The disclosure provided herein describes systems and methods for navigating digital video content in a non-linear manner.

Video content is a common medium by which entertainment or stories are presented to viewers. Stories told via video content have generally been presented to viewers in episodic or sequential fashion. There is a single story that follows a singular, linear storyline. Every viewer experiences the content in the same, linear way, consuming episode by episode in the order, timing, and method determined by the video content producer. The viewer is not given any ability to interactively participate in the presentation or to affect how they experience the content. The producers have made all of the key decisions, such as the perspective from which a viewer views a scene, or what information is presented to a user at a particular time, or the ordering of the sequence of events that are revealed to a user. While this method provides an effective story-telling tool, allowing video content producers to essentially script how viewers will experience their content, it limits a viewer's ability to actively engage or participate in the video content. Instead, viewers are simply along for the ride and follow the set path determined by the video producers.

The present disclosure provides for systems and methods for navigating video content in a non-linear fashion. In a first embodiment, the presently disclosed systems and methods may be applied to currently available, episodic (i.e., linear) video content to allow a user to navigate the linear video content in non-linear ways. For example, in a television series that has run for multiple seasons, there may be hundreds of hours of video content. The hundreds of hours of video content have been provided to users in a particular, linear sequence, with one episode following another, and the user consumes the video content in this predetermined order. In the presently disclosed system, metadata tags are added to individual scenes or clips in the video content. These metadata tags allow for sorting and searching of the video content so that the user can experience the video content in a non-linear manner. Several examples of types of metadata tags will be discussed, and then it will be disclosed how these tags may be used to navigate video content in a nonlinear fashion.

In a first example, the metadata tags may relate to certain characters in the story, with each scene or video clip involving the character being tagged to include this information. By tagging each scene or clip with character metadata, a viewer can choose to sort video content and watch only those scenes that include a particular character or combination of characters. For example, in Star Wars, a viewer may be able to submit an instruction to a video player or other computing device to play only clips with Darth Vader and Luke Skywalker, and, using the metadata tags, the video player can find and play every scene in which both of those characters are present. This tagging and re-ordering or re-sorting can be performed on any digital video content, including, but not limited to, DVDs, Blu-Rays, or digital video files on a local or remote drive.

Metadata tags may also relate to particular storypoints or subplots. Within a story, there may be particular subplots that are of interest to viewers. For example, in a particular TV series, viewers may want to watch only those scenes having to do with the main character's romantic endeavors or past love interests. A viewer might be able to try to do this using the character tags described above, by sorting only for those scenes in which the main character or his love interests are present in the scene. However, such searches might be over-inclusive, including scenes in which the characters are present, but having nothing to do with their romance, or under-inclusive, leaving out scenes that are relevant to the subplot but do not include the characters in the scene. By tagging all scenes or clips with subplot metadata, a user can easily search for scenes relating to a particular subplot or storypoint and watch them.

Metadata tags might also be employed to allow a user to experience the storyline in a different sequence than that decided by the content producers. For example, users may be able to view a story entirely chronologically, rather than in mixed sequences of present, past, and future. Flashbacks or flash-forwards are commonly used story-telling methods to reveal more information about a character or to provide the user with some anticipation of what will happen in the future. A user might learn something about a character's past, which will enlighten the user as to why the character is taking certain actions in the present. A user may want to re-order the video content so that they are able to see the story chronologically, rather than in the flash-forward, flashback mode chosen by the video producers. Metadata tags can be placed in scenes to denote where in the fictional timeline the events took place, so that scenes or clips can be reordered based on this fictional timeline. A useful example of this might be seen in the TV series Lost, in which there were multiple characters and frequent uses of flashbacks. In Lost, the viewer is introduced to each character as they crash onto an island, but bits and pieces of a character's past are revealed in each episode using flashbacks. Often, the flashbacks will refer back to different periods in a character's past. Rather than viewing these flashbacks in the context of the present scene, a viewer can reorder all of a character's scenes chronologically so that they can view the character's full story in chronological order from start to finish.

In a further aspect, an audio-visual interface may be presented for users to navigate content chronologically. For example, the user may be able to invoke a "time machine" feature in which the user is presented with a visual and/or audio indication that they are moving forward or backward through the timeline. The time machine interface may present the user with metadata pop ups or text bubbles that indicate the passage of time. The information presented to the user may also include additional metadata tags so that the user can choose to explore different aspects of the past or future of each of these tags. For example, the user may be able to view the past and/or future aspects of a particular character, or a particular location.

Other examples of metadata tags might include memorable catchphrases or expressions by one or more characters (e.g., Buzz Lightyear's "To Infinity and Beyond!" in the Toy Story films), themes that repeat throughout a storyline (e.g., Tony Soprano and the ducks in The Sopranos), or particular categories of scenes that viewers may want to watch (e.g., "musical numbers" in a musical, or "battles" in a war movie, or "aliens" in a sci-fi TV series).

Although several specific examples of metadata tags have been given, it will be understood that these tags may be applied in a multitude of ways, and can include information relevant to any method by which a viewer might want to search, sort, or re-order video content. Multiple tags may be applied to an individual clip or scene so that the scene shows up as a result in all relevant searches or sorts.

Metadata tags may be applied by the video content producers, either during or after production of the video content. Tags may also be applied by users. It may be the case that particular scenes, storylines, recurring events, or other aspects of video content will end up being of interest to users that the video content producers may not have anticipated, and, therefore, did not tag. A user tagging application may be provided for users to create video content tags that may be shared with other users. Similar to creating a custom music playlist, custom video content tags can allow users to save their individual non-linear navigation of a video for their personal viewing in the future, or to share their custom non-linear navigation with other users. Metadata tags may also be generated automatically by an application on a computing device. For example, character metadata tags may be applied using face or voice recognition, or context-based metadata tags, such as battle scenes, may be applied using visual or audio indicators, such as the sound or visual image of explosions or gunfire.

The metadata tags described above allow a user to navigate through linear video content in non-linear ways by tagging video clips with metadata tags and running searches, performing sorting functions, and/or re-ordering the video clips based on user manipulation of the metadata tags. FIG. 1 provides an exemplary user interface 10 through which a user may navigate video content, in accordance with an embodiment of the present disclosure. In FIG. 1, the user interface 10 is displayed in a tablet-style computing device 30. However, it should be understood that any device capable of playing video content may be used. The tablet-style computing device 30 has a display 32. Within the display 32, the user interface 10 has a primary viewing area 12 and a navigation pane 14. The navigation pane 14 has a selection of related scenes 16a-d that are related to the current scene being played in the primary viewing area 12. The related scenes may feature similar characters, relate to the same subplot, feature a similar catchphrase, or any other relation, as indicated by the metadata tags on the clips. The related scenes 16 are selectable by the user, and may lead the user to a particular scene, or, alternatively, may lead the user to a list of related scenes. For example, the first related scene 16a may relate to the current scene's subplot. In one embodiment, selecting the first related scene 16a may result in playing that single scene, or it may result in displaying a list of all related scenes that have been tagged with the particular subplot. In a further aspect of this embodiment, selection of the related scene may cause the current scene in the primary viewing area 12 to pause, and then a small overlay window 18 may play the related scene or display the listing of related scenes. Alternatively, the selected related scene or listing of scenes may take up the entire primary viewing area 12.

The user may also be provided with control over the related scenes 16 that are displayed in the navigation pane 14. Navigation keys 17 may be displayed that allow a user to perform any of the navigation functions (e.g., searching, sorting, re-ordering) while the user is viewing a current video clip. In FIG. 1, the top two navigations keys 17a, 17b list two characters from the video content. The user may select "Character 1" (key 17a), and then the related scenes 16a-d may display other scenes that include Character 1. By selecting the "Location" navigation key 17c, the related scenes 16a-d would display other scenes taking place at the particular location of the current scene. For example, if a Star Wars film was playing on primary viewing area 12, and the current scene was Luke Skywalker on Tatooine, navigation key 17a might read "Luke Skywalker," and navigation key 17c might read "Tatooine," allowing the viewer to easily pull up a list of scenes involving Luke Skywalker or a list of scenes taking place on Tatooine. The number and labeling of navigation keys 17 may remain constant (e.g., always have a "Character 1," "Character 2," and "Location" key), or they may change according to the video clip that is presently displayed in the primary viewing area 12. And, of course, the navigation keys 17 may relate to any other metadata tags, not only those that relate to Character or Location. If a user selects one of the related scenes or a navigation key, the main video may be interrupted while the user is presented with all of the video clips relevant to the user's selection. Upon completion, the original video may resume play. This experience may be provided using any device that is capable of video playback (e.g., on a blu-ray disc, or streaming internet video, or part of an IPTV/interactive application that is laid on top of a live television broadcast, etc.).

In a further, or alternative, embodiment, additional information may be presented along with or in place of the scenes 16a-d. For example, if a user moves a cursor over any of the scenes 16a-d, a text bubble may pop up to provide the user with additional information relating to that scene. This additional information may include a description of the scene, and/or metadata information such as the characters involved, the location of the scene, subplots in which the scene is involved, etc. Alternatively, rather than displaying screenshots or clips of related scenes, as they are presented in FIG. 1, a text listing of related scenes may be provided for the user. In a further aspect, a user may be able to perform an operation to re-order or remove certain of the scenes presented in the navigation panel 14, by, for example, clicking and dragging the scenes 16.

In FIG. 1, the navigation panel 14 is presented to the user underneath the primary viewing area 12. However, to limit distractions to the user by the constantly changing related scenes, it may be preferable to hide the navigation panel 14 so that the primary viewing area 12 takes up the entire display 32. When the navigation panel 14 is hidden, a user may be alerted to the availability of related content via an indicator 20. The user can then select the indicator 20 if they want to reveal the navigation pane 14 so that they can navigate related content. Navigation panel 14 and the primary viewing area 12 may also be implemented on separate screens. For example, the user may view video content on a television (which would be the primary viewing area 12), and view the navigation panel 14 on a tablet device or smart phone. In this scenario, the television (i.e., primary viewing device) and the tablet (i.e., secondary viewing device) would be in communication with one another so as to sync the content that is displayed on the two devices.

Figure 2:
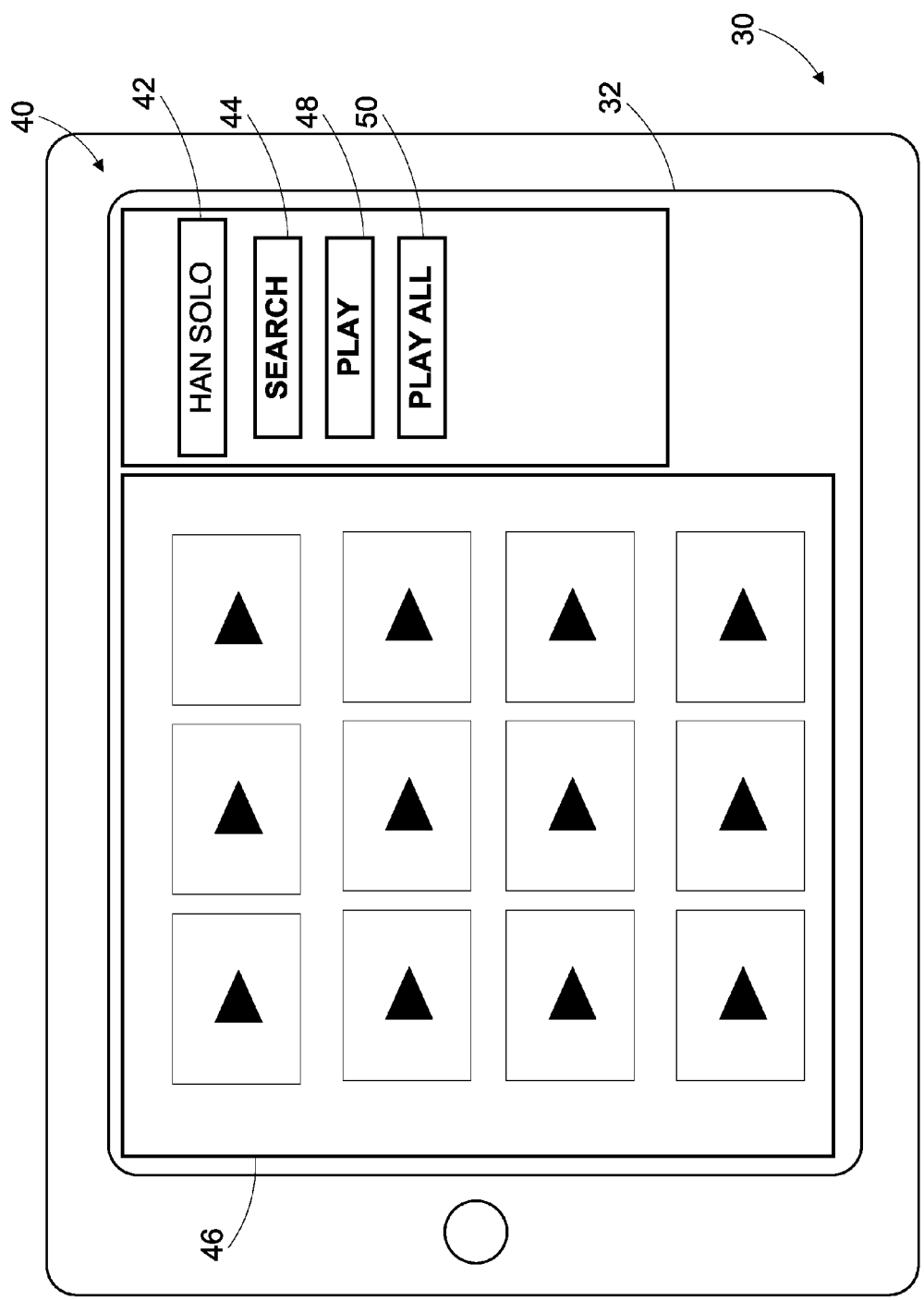
FIG. 2 is an example digital video content search interface in accordance with an embodiment of the present disclosure.

FIG. 2 presents a possible user interface 40 that a user might use to search, sort, and/or re-order content. The user interface 40 includes a search box 42. A user enters search terms into the search box 42, and selects the "Search" button 44. Metadata tags may also allow users to run Boolean searches so as to include or exclude one or more categories of metadata in the search and include multiple search criteria in a single search. An application running locally on the computing device or remotely on a video content server conducts a search for all video content that has been tagged with the search terms. In this case, a search has been run for "Han Solo," and the search will display in a results pane 46 all scenes or content in which Han Solo is present. The user may choose to play a single scene via button 48, or the user may choose to play all of the scenes sequentially via button 50. As discussed above, there may be options for the user to view all of the scenes sequentially, as they appear in the original linear video content, or the user may be given the option to view all of the scenes chronologically (i.e., in their order along the fictional timeline), or the user may sort or arrange the results in alternative sequences according to the user's preferences. A user may also have the option to export the search results into a metadata file, a single video, or a single video with chapter information, such that the video sequence can be saved and viewed later. The option to export a set of video clips into a single file may also be provided with a user-created video clip playlist.

It should be understood that although the above disclosure provides specific examples using particular types of video content (e.g., episodic, perspective-based storylines, etc.) and particular navigation tools (e.g., search, sort, re-order), the spirit and substance of the present disclosure embraces many approaches to non-linear navigation. The search tools depicted in FIG. 2 may put the onus on a searcher to provide context based on their search term input. In contrast, one aspect of the present disclosure may relate metadata that is curated in such a way that the user experience has context within the storyline of the content. Certain approaches may not be tied to a tightly curated storyline, allowing users the freedom to navigate at their own pace and direction through a loosely connected collection of video content. It should be clear from the present disclosure that the navigation can be as structured or unstructured as is appropriate for a given circumstance or a given set of video content. This is a framework for the organization of content based on context and historical metadata, which is more of a navigation approach rather than a search. This, in some aspects, provides a framework to create a curated navigation through video content, such that this method is more a curation presentation tool rather than a search tool. Further embodiments of this approach will now be discussed in greater detail.

While the present disclosure has, to this point, focused on applying the present systems and methods to currently existing, episodic content, it can be applied to any video content. For example, the presently disclosed systems and methods for allowing a user to navigate content in any way the user chooses may lead to new, non-episodic ways of presenting stories and video content to users. Once again, the television series Lost will be used as an example to illustrate the larger concept of non-linear navigation. Rather than presenting the television series to users on an episode by episode basis, viewers may be presented with a single source of content that the user may navigate in a plurality of ways. The user may choose to watch the storyline of each of the characters individually, so that the user can watch the entire series from the perspective of Jon Locke, and then watch the series from the perspective of Kate Austen, and then watch the series from the perspective of Jack Shepard, etc. Within each character's storyline, the user may choose to view all events chronologically, or in some other predetermined arrangement. By viewing the storyline of each character, and how the storylines interact and overlap, a user can begin to put together the entire story and understand the context behind each character more fully. Additionally, different viewers may choose to view the content in different sequences, possibly by choosing a different first character, or, after following a first character for a period of time, choosing to follow another character's storyline. By allowing the user to make these choices, the presently disclosed systems and methods allow each user to customize their own viewing experience, and every viewer's experience can be different based on their individual choices.

Figure 3:
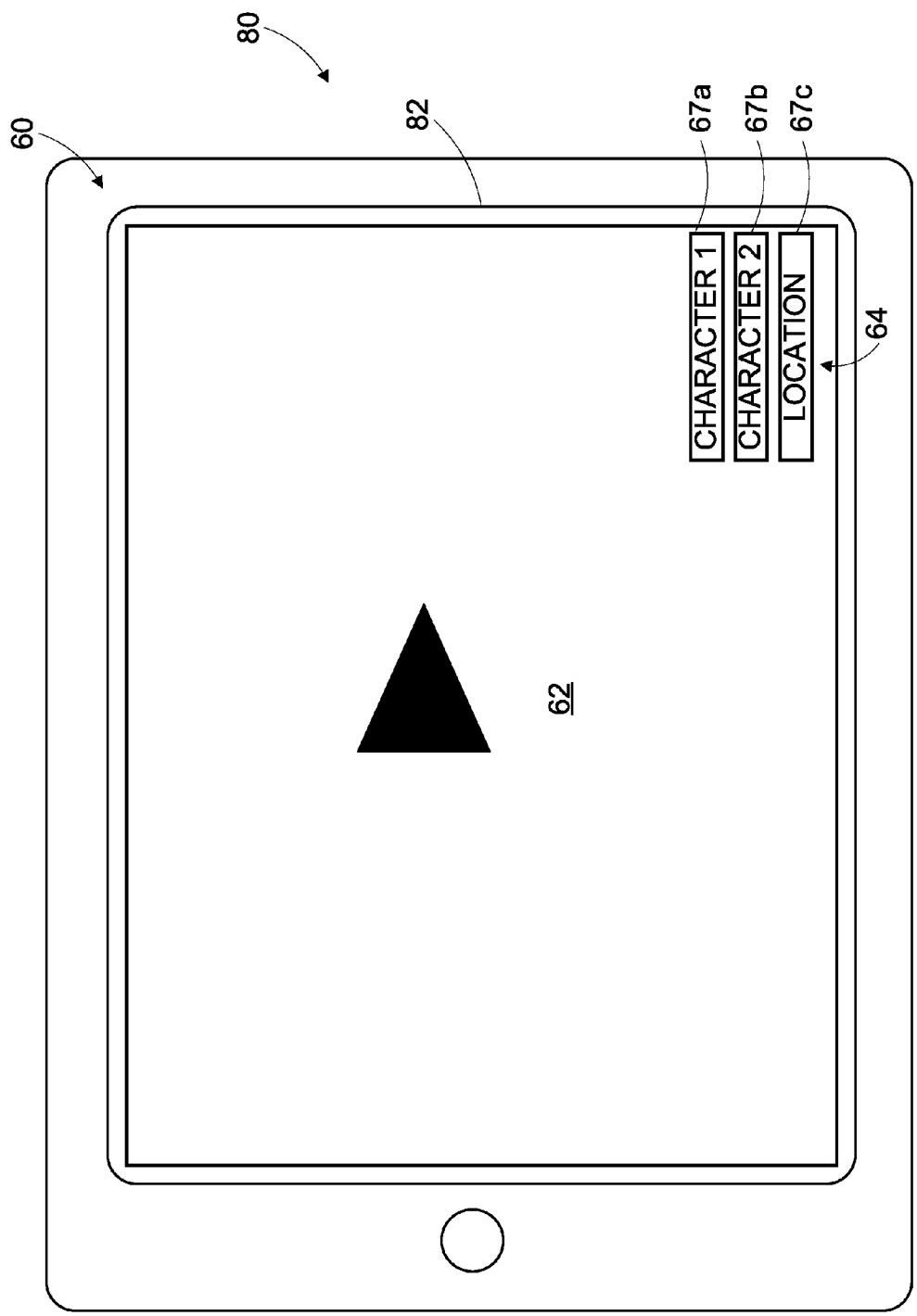
FIG. 3 is another example digital video content navigation interface in accordance with an embodiment of the present disclosure.

FIG. 3 provides another example of a user interface that may be used to navigate video content in the non-linear manner described above. A navigation interface 60 is presented on a computing device 80 having a display 82. The navigation interface 60 has a primary viewing area 62, and a navigation panel 64. In the primary viewing area 62, the user is presented with video content. In the navigation panel 64, the user is presented with options to customize or otherwise alter their viewing experience so that they are able to navigate through the video content in their own way.

In FIG. 3, the navigation panel 64 displays three navigation options 67a-c. These navigation options may change based on what is currently shown in the primary viewing area 62, and may also be based on content metadata discussed above. In FIG. 3, the navigation options correspond to a Character 1 option 67a, a Character 2 option 67b, and a Location option 67c. These options may be based on scene metadata to automatically display all the characters currently in the scene, or the location of the current scene.

The user can use the navigation options 67 to navigate a plurality of possible paths through the video content. For example, the user may start the video content with a particular scene that will follow a particular path. However, if the user wishes to change the current path, the user can then use the navigation options 67 to choose a particular character to follow (e.g., Character 1). When Character 1 leaves the particular scene, the user will continue to follow Character 1's path, moving from scene to scene as Character 1 does.

As Character 1 moves to different locations and interacts with different characters, the navigation panel 64 and the navigation options 67 are appropriately updated. As the navigation options 67 are updated, the user can make the decision to switch to a different character (e.g., Character 2), so that from that point on, the user will follow Character 2's path. Alternatively, the user may select the Location navigation option 67c, so that as the story progresses, and characters move in and out of that scene location, the user will continue to view the selected location and follow the story's path through the location. The navigation panel 64 and the navigation options 67 allow a user to decide how they receive the video content information, because they make the decision as to which characters to follow or which locations to observe.

The metadata tags for each scene create an interconnectedness between video clips so that the user can define their own path by which to navigate the content. Character metadata creates a character path that the user may continue to follow by selecting a particular character. The "character path" contains a string of video clips that are related to that particular character, so that the user will continue to follow the story from the character's perspective or learn more about the character's backstory, etc. Location metadata creates a location path that allows a user to view the story as it unfolds from a particular scene location. These different paths allow a user to experience the video content from different perspectives. The character path might allow a user to experience the story as if the user is the character, or an observer of the character. The location path might allow the user to experience the story as a bystander at a particular location. Changing the location path is similar to the experience of a user moving from one location to another to view the story unfolding. The intersections of these paths allow a user to move from one path to another (e.g., by selecting another navigation option 67).

Metadata tags may be generated by those involved in production of the video content, or they may be user-generated. As such, metadata tags may be provided to the user at the time they receive the video content, or they may be applied after release of the video content. In this way, the producers of the video content may continue to provide additional metadata tags to provide new ways to navigate content, or potentially add new video content that is incorporated with previous video content to create new navigation paths. Additionally, users (i.e., viewers) of the video content may apply their own metadata tags to create their own, user-generated navigation paths. These user-generated metadata tags and navigation paths may be distributed to other users by the video content producers, or shared amongst users. User-generated metadata tags and navigation paths allow users to interact with the video content in their own unique way, and then interact with other users to share their unique navigation of the content.

Figure 4:
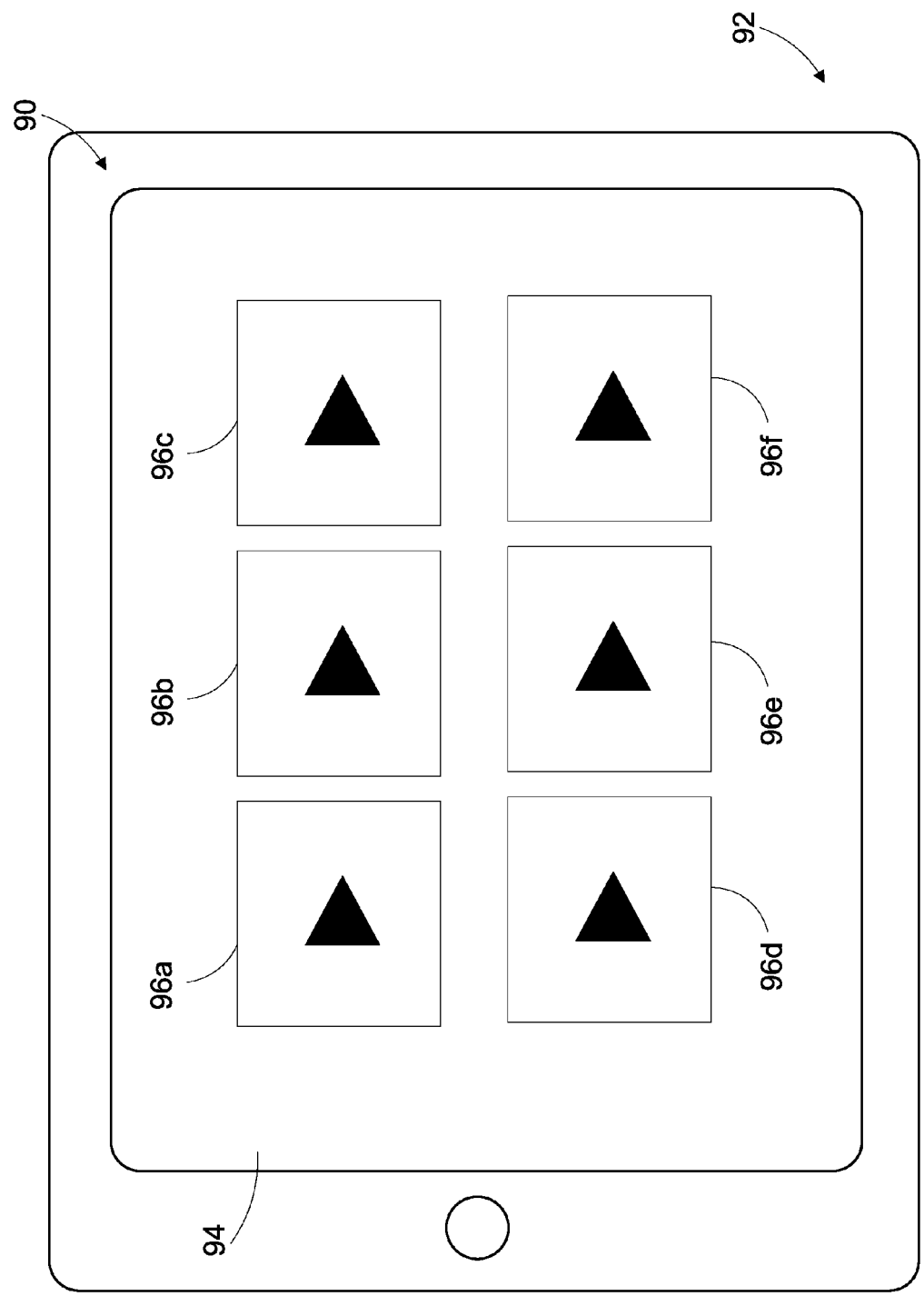
FIG. 4 is an example multi-view navigation option interface.

The above embodiment discussed a means to change paths via intersection points, so that when characters or locations intersect at a particular scene, the user may veer from the current path to another path via the use of navigation options 67. Users may also be given the option to jump from one navigation path to another regardless of the intersection of their current path with another. For example, rather than only being able to follow characters once they have entered the scene, the user may be able to pull an entire character list and select which character they would like to begin following at any given moment. Similarly, the user may be able to pull up a locations list and select which location they would like to navigate to at a given moment. In a further aspect of this embodiment, the user might be able to click the "Location" navigation options 67*c* to pull up multiple video screens, with each video screen showing a time-based feed of what is happening at a particular location (i.e., at the current time in the story). FIG. 4 provides an example of a multi-view interface 90 implemented on a computing device 92. The multi-view interface 90 has a plurality of video feeds 96*a-f*. Each video feed might correspond to a particular location, and might provide a live feed of each location so that the user can see what is taking place at each scene. Video feeds 96*a-d* might show an empty landscape or room because no characters are currently at those locations, whereas video feed 96*e* might show a restaurant where two characters are dining, and video feed 96*f* might show an office where another character is working. The user can see what is happening at each location, and select the location that looks most interesting to the user. Similar layouts may be used for the other navigation options, such as a multi-view screen showing a time-based feed of what every character is doing at the present moment within the story, so that the user can select which character they would like to follow. The navigation panel 64 in FIG. 3 allows a user to switch story paths at intersection points where certain characters or locations intersect, while the multi-view screen in FIG. 4 allows a user to jump from one navigation path to another based on what looks most interesting to the user. As discussed above with FIGS. 1 and 2, the navigation panel 64 (FIG. 3) or the multi-view interface 90 (FIG. 4) may be displayed for a user on a separate screen or a separate device from the primary video content. This allows the user to view the primary video content on the primary device, while navigating on the secondary device or display.

Additionally, although FIG. 3 shows examples of character or location navigation options, additional navigation options may be contemplated. An example might include subplot options, in which a user can choose a single subplot among multiple subplots so that the story will navigate automatically through a particular subplot, until the user makes a different navigation option selection. Navigation paths may be determined based on any metadata applied by a user or the content creator.

Additional choices may be given to a user that can affect the story itself. For example, a story may have a plurality of possibly endings. The user may be presented with certain choice options in the navigation panel 64, and the ending that is chosen is determined by the viewer's decisions.

The presently disclosed methods and systems also allow for the addition of "optional" content that may be available only to certain users, for example, those who pay a premium subscription fee. An example might be a scenario in which a basic subscription fee allows the user to access the storylines of a core group of characters, while a premium subscription fee may grant the premium user access to additional characters. The additional characters' storylines may reveal information that would not have been otherwise known by or accessible to the user.

The presently disclosed methods and systems also allow for a further interactive aspect to further incentivize users to navigate the content in a variety of ways. Rewards, such as locked or secret content or merchandise discounts may be provided based on the route navigated by the user. For example, if a user travels a route that focuses on a particular romantic subplot, an additional "romantic" scene may be unlocked or the user may receive discounts on any products relating to that subplot. Or if a user views all of the action scenes in the content, then rewards may be presented to the user based on the user's preference of action-related content. Rewards may also be more general in nature, such that navigation of the content for a certain amount of time or navigating a certain number of navigation paths may unlock rewards for the user. All of these rewards incentivize users to continue viewing the content in a plurality of ways and to continue to explore the content to unlock further rewards.

Where components or modules of the disclosed interface are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 5:
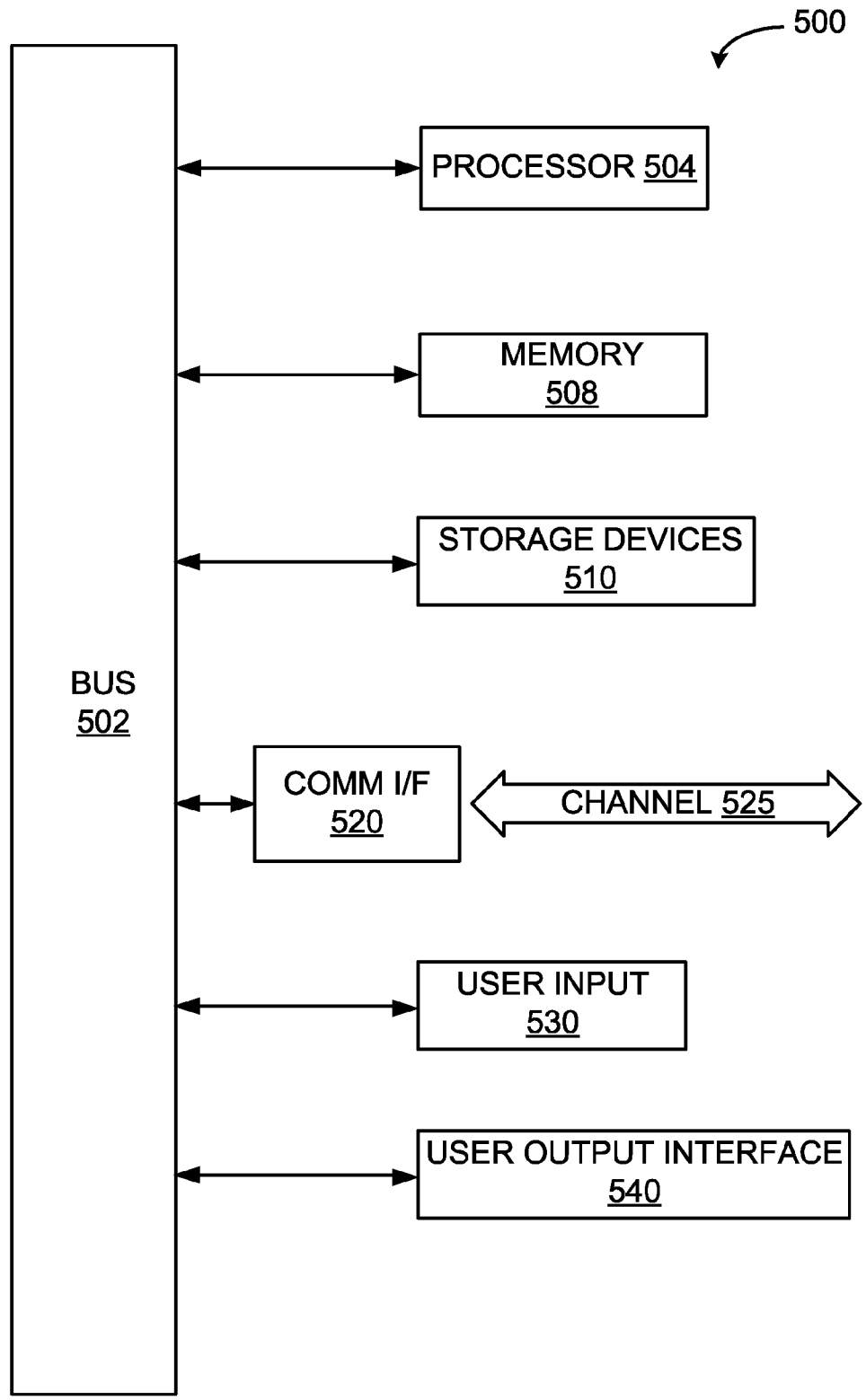
FIG. 5 is an example computing module that may be used to implement certain embodiments of the present disclosure.

Referring now to FIG. 5, computing module 500 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 500 might also represent computing capabilities embedded within or otherwise available to a given device. For example, a computing module might be found in other electronic devices such as, for example, televisions, home theaters, Blu-Ray disc players, DVD players, in-car entertainment systems, video game consoles, video download or streaming devices, portable DVD players. and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. Memory may include any non-transitory storage medium. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504. The computing module 500 might also include one or more various forms of information storage unit 510, which might include, for example, a magnetic tape drive, an optical disc drive, a solid state drive, or any other non-volatile memory.

Computing module 500 might also include a communications interface 520. Communications interface 520 might be used to allow software and data to be transferred between computing module 500 and external devices. Examples of communications interface 520 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 520 might typically be carried on signals, which can be electronic, electromagnetic (which includes optical) or other signals capable of being exchanged by a given communications interface 520. These signals might be provided to communications interface 520 via a channel 525. This channel 525 might carry signals and might be implemented using a wired or wireless communication medium. Some examples of a channel might include a phone line, a cellular link, an RF link, an optical link, a network interface, a local or wide area network, and other wired or wireless communications channels.

Computing module 500 might also include one or more user inputs 530. The user input allows for the user to enter commands to the computing module 500 and interact with it. Examples of user inputs might include a computer mouse, a keyboard, a touch-sensitive screen, a mousepad, a joystick, an accelerometer, a gyroscope, or any other user input mechanism. These user inputs may be used to interact with the disclosed interface. For example, if the computing device is a tablet device with a touchscreen, the user may swipe to the left or the to the right to move through the digital media assets horizontally, swipe up or down to the move through the assets vertically, and tap the screen to make selections of digital media assets. Alternatively, if the computing device is a television, then the user might use a remote control or other remote input means to move horizontally or vertically or to make a selection. Similarly, if the computing device is a keyboard, a mouse or keyboard or trackpad may be used to interact with the user interface.

The computer module 500 might also include one or more user output interfaces 540. The user output interfaces 540 might be used to interact with the user by presenting information or sensory outputs for the user. Examples of user output interfaces might include visual outputs, such as a display screen or monitor, or audio outputs, such as a speaker or headphone output.

In this document, the terms "computer program medium" and "computer usable medium" are used to generally refer to media such as, for example, memory 508, storage unit 510, and channel 525. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof;

the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure.

The invention claimed is:

1. A method for non-linear navigation of video content organized according to a prescribed linear storyline, the method comprising:
    receiving a video content asset, wherein the video content asset comprises at least one of a movie and a series of episodic video content, the video content asset comprising a plurality of video clips that have been previously organized according to the prescribed linear storyline, wherein the prescribed linear storyline defines an order for presenting each of the plurality of video clips;
    receiving a plurality of information tags including one or more information tags for each of the plurality of video clips, the plurality of information tags connecting the plurality of video clips in a plurality of navigation paths, each of the navigation paths defining a particular order for presenting a particular set of the plurality of video clips determined at least in part by the plurality of information tags, wherein the particular order for presenting the particular set of the plurality of video clips defined by each of the navigation paths differs from the order for presenting each of the plurality of video clips defined by the prescribed linear storyline;
    presenting a first video clip from the plurality of video clips, according to the prescribed linear storyline;
    displaying a set of navigation options for selection by a user, each of the navigation options corresponding to one of the navigation paths, wherein each of the set of navigation options is presented based on the one or more information tags of the first video clip or based on a user search of information tags;
    receiving a navigation option selection corresponding to one of the navigation paths; and
    presenting a second video clip from the plurality of video clips based on the navigation path corresponding to the navigation option selection, in order to provide a curated, non-linear navigation through video content of the video content asset,
    wherein the plurality of information tags comprise one or more subplot information tags, each of the one or more subplot information tags corresponding to a particular subplot of the prescribed linear storyline, and wherein displaying the set of navigation options comprises displaying a plurality of video feeds, each of the plurality of video feeds corresponding to one of the particular subplots of the prescribed linear storyline.

2. The method of claim 1, wherein:
    the plurality of information tags further comprises one or more character information tags, each of the one or more character information tags corresponding to a particular character, and
    each of the one or more character information tags connects a set of the plurality of video clips to form a character path,
    and further wherein
    the set of navigation options comprises one or more character options based on the character information tags, such that selection of one of the character options results in presentation of the video content asset according to a particular character path.

3. The method of claim 2, wherein displaying the set of navigation options further comprises displaying one or more of the character options based on characters present in the first video clip.

4. The method of claim 2, wherein displaying the set of navigation options further comprises displaying a second plurality of video feeds, each of the second plurality of video feeds corresponding to a particular character.

5. The method of claim 4, wherein each of the second plurality of video feeds displays a time-based feed of the particular character.

6. The method of claim 1, wherein:
    the plurality of information tags further comprises one or more location information tags, each of the one or more location information tags corresponding to a particular scene location, and
    each of the one or more location information tags connects a set of the plurality of video clips to form a location path,
    and further wherein
    the set of navigation options comprises one or more location options based on the location tags, such that selection of a location option results in presentation of the video content asset according to one of the location paths.

7. The method of claim 6, wherein displaying the set of navigation options further comprises displaying one of the location options based on a particular scene location of the first video clip.

8. The method of claim 6, wherein displaying the set of navigation options further comprises displaying a second plurality of video feeds, each of the second plurality of video feeds corresponding to one of the particular scene locations.

9. The method of claim 8, wherein each of the second plurality of video feeds displays a time-based feed of the corresponding particular scene location.

10. The method of claim 1, wherein
    each of the one or more subplot information tags connects a set of the plurality of video clips to form a subplot path,
    and further wherein
    the set of navigation options comprises one or more subplot options based on the one or more subplot information tags, such that selection of one of the subplot options results in presentation of the video content asset according to one of the subplot paths.

11. The method of claim 10, wherein displaying the set of navigation options comprises displaying one or more of the subplot options based on the subplots involved in the first video clip.

12. The method of claim 10, wherein each of the video feeds displays a time-based feed of the corresponding particular subplot.

13. The method of claim 1, wherein the first video clip is presented on a first display, and the set of navigation options are displayed on a second display.

14. The method of claim 1, wherein receiving the plurality of information tags relating to the plurality of video clips further comprises receiving a plurality of user-generated information tags relating to the plurality of video clips, the plurality of user-generated information tags connecting the plurality of video clips in one or more user-generated navigation paths, each of the user-generated navigation paths defining a particular set of video clips in a particular order determined at least in part by the user-generated information tags.

15. The method of claim 1, further comprising sharing at least one user-generated navigation path with a second user such that the second user is able to navigate the video content asset according to the at least one user-generated navigation path.

16. A non-transitory computer readable medium comprising an instruction set configured to cause a computing device to perform:
receiving a video content asset, wherein the video content asset comprises at least one of a movie and a series of episodic video content, the video asset content comprising a plurality of video clips that have been previously organized according to a prescribed linear storyline, wherein the prescribed linear storyline defines an order for presenting each of the plurality of video clips;
receiving a plurality of information tags including one or more information tags for each of the plurality of video clips, the plurality of information tags connecting the plurality of video clips in a plurality of navigation paths, each of the navigation paths defining a particular order for presenting a particular set of the plurality of video clips determined at least in part by the plurality of information tags, wherein the particular order for presenting the particular set of the plurality of video clips defined by each of the navigation paths differs from the order for presenting each of the plurality of video clips defined by the prescribed linear storyline;
presenting a first video clip from the plurality of video clips, according to the prescribed linear storyline;
displaying a set of navigation options for selection by a user, each of the navigation options corresponding to one of the navigation paths, wherein each of the set of navigation options is presented based on the one or more information tags of the first video clip or based on a user search of information tags;
receiving a navigation option selection corresponding to one of the navigation paths; and
presenting a second video clip from the plurality of video clips based on the navigation path corresponding to the navigation option selection, in order to provide a non-linear navigation through video content of the video content asset,
wherein the plurality of information tags comprise one or more subplot information tags, each of the one or more subplot information tags corresponding to a particular subplot of the prescribed linear storyline, and wherein displaying the set of navigation options comprises displaying a plurality of video feeds, each of the plurality of video feeds corresponding to one of the particular subplots of the prescribed linear storyline.

17. The non-transitory computer readable medium of claim 16, wherein
the plurality of information tags further comprises one or more character information tags, each of the one or more character information tags corresponding to a particular character, and each of the one or more character information tags connects a set of the plurality of video clips to form a character path,
and further wherein
the set of navigation options comprises one or more character options based on the character information tags, such that selection of one of the character options results in presentation of the video content asset according to a particular character path.

18. The non-transitory computer readable medium of claim 17, wherein displaying the set of navigation options further comprises displaying one or more of the character options based on characters present in the first video clip.

19. The non-transitory computer readable medium of claim 17, wherein displaying the set of navigation options further comprises displaying a second plurality of video feeds, each of the second plurality of video feeds corresponding to a particular character.

20. The non-transitory computer readable medium of claim 19, wherein each of the second plurality of video feeds displays a time-based feed of the corresponding particular character.

21. The non-transitory computer readable medium of claim 16, wherein
the plurality of information tags further comprises one or more location information tags, each of the one or more location information tags corresponding to a particular scene location, and each of the one or more location information tags connects a set of the plurality of video clips to form a location path,
and further wherein
the set of navigation options comprises one or more location options based on the location tags, such that selection of a location option results in presentation of the video content asset according to one of the location paths.

22. The non-transitory computer readable medium of claim 21, wherein displaying the set of navigation options further comprises displaying one of the location options based on a particular scene location of the first video clip.

23. The non-transitory computer readable medium of claim 21, wherein displaying the set of navigation options further comprises displaying a second plurality of video feeds, each of the second plurality of video feeds corresponding to one of the particular scene locations.

24. The non-transitory computer readable medium of claim 23, wherein each of the second plurality of video feeds displays a time-based feed of the corresponding particular scene location.

25. The non-transitory computer readable medium of claim 16, wherein
each of the one or more subplot information tags connects a set of the plurality of video clips to form a subplot path,
and further wherein
the set of navigation options comprises one or more subplot options based on the one or more subplot tags, such that selection of one of the subplot options results in presentation of the video content asset according to one of the subplot paths.

26. The non-transitory computer readable medium of claim 25, wherein displaying the set of navigation options comprises displaying one or more of the subplot options based on the subplots involved in the first video clip.

27. The non-transitory computer readable medium of claim 25, wherein each of the video feeds displays a time-based feed of the corresponding particular subplot.

28. The non-transitory computer readable medium of claim 16, wherein the first video clip is presented on a first display, and the navigation options are displayed on a second display.

29. The non-transitory computer readable medium of claim 16, wherein receiving the plurality of information tags relating to the video clips further comprises receiving a plurality of user-generated information tags relating to the plurality of video clips, the plurality of user-generated information tags connecting the plurality of video clips in one or more user-generated navigation paths, each of the user-generated navigation paths defining a particular set of video clips in a particular order determined at least in part by the user-generated information tags.

30. The non-transitory computer readable medium of claim 16 further comprising sharing at least one user-generated navigation path with a second user such that the second user is able to navigate the video content asset according to the at least one user-generated navigation path.

* * * * *